US008665695B2

(12) United States Patent
Liao et al.

(10) Patent No.: US 8,665,695 B2
(45) Date of Patent: Mar. 4, 2014

(54) METHODS FOR TRANSCEIVING DATA IN MULTI-BAND ORTHOGONAL FREQUENCY DIVISION MULTIPLE ACCESS COMMUNICATIONS SYSTEM AND COMMUNICATIONS APPARATUSES UTILIZING THE SAME

(75) Inventors: Pei-Kai Liao, Nantou County (TW); I-Kang Fu, Kaohsiung County (TW)

(73) Assignee: Mediatek Inc., Hsin-Chu (TW)

( * ) Notice: Subject to any disclaimer, the term of this patent is extended or adjusted under 35 U.S.C. 154(b) by 614 days.

(21) Appl. No.: 12/498,531

(22) Filed: Jul. 7, 2009

(65) Prior Publication Data

US 2010/0002571 A1   Jan. 7, 2010

Related U.S. Application Data

(60) Provisional application No. 61/078,509, filed on Jul. 7, 2008.

(51) Int. Cl.
*H04J 11/00* (2006.01)

(52) U.S. Cl.
USPC ............ 370/208; 370/344; 375/316; 375/260

(58) Field of Classification Search
USPC .................. 370/208, 344, 260; 375/316, 260
See application file for complete search history.

(56) References Cited

U.S. PATENT DOCUMENTS

| 2004/0125742 A1* | 7/2004 | Schmidt ........................ 370/208 |
| 2006/0285599 A1 | 12/2006 | Seki et al. |
| 2007/0127361 A1 | 6/2007 | Kasami et al. |
| 2007/0297379 A1 | 12/2007 | Gorokhov et al. |
| 2008/0043866 A1* | 2/2008 | Mujtaba ........................ 375/260 |
| 2008/0043879 A1 | 2/2008 | Gorokhov et al. |
| 2008/0056183 A1* | 3/2008 | Gorokhov et al. ............ 370/329 |

FOREIGN PATENT DOCUMENTS

| CN | 1885726 | 12/2006 |
| JP | 10-322307 | 12/1998 |
| JP | 2001-156741 | 6/2001 |
| JP | 2002-319917 | 10/2002 |
| JP | 2005-005781 | 1/2005 |

(Continued)

OTHER PUBLICATIONS

Virtual Multi-Carrier Operation for IEEE 802 if IEEE S802.16m-08/364rl Yin, Hujun et al.; May 8, 2008.

(Continued)

*Primary Examiner* — David Oveissi
(74) *Attorney, Agent, or Firm* — McClure, Qualey & Rodack, LLP (57) ABSTRACT

A communications apparatus is provided. A receiving module receives a signal with a predetermined signal bandwidth. A low pass filter filters the signal to obtain a filtered signal. A filter bandwidth of the low pass filter is wide enough to pass the regular sub-carrier frequency components and at least half of the guard sub-carrier frequency components of the signal. An analog to digital converter samples the filtered signal with a sampling rate exceeding a standard sampling rate defined in accordance with the predetermined signal bandwidth of the signal to obtain a plurality of digital samples. A Fast Fourier Transform module performs a fast Fourier transform on a predetermined number of points of the digital samples to obtain a plurality of transformed samples. The predetermined number exceeds a standard number defined in accordance with the predetermined carrier bandwidth. A sub-carrier collector collects the data from the transformed samples.

20 Claims, 7 Drawing Sheets

(56) References Cited

FOREIGN PATENT DOCUMENTS

| JP | 2006-092852 | 4/2006 |
|---|---|---|
| JP | 2008-072275 | 3/2008 |
| WO | 2006043312 | 4/2006 |
| WO | 2007149961 | 12/2007 |

OTHER PUBLICATIONS

English abstract of CN1885726, pub. Dec. 27, 2006.
Danno, S., et al.; "A Study on LPF Estimation Based on Adaptive Filter for OFDM System;" IEICE Technical Report SIP2005-138; 2006; pp. 13-19.
Hongyun, Q., et al.; "Proposal for IEEE 802. 16m OFDMA Numerology;" IEEE 0802. 16m-08/080r1; 2008; pp. 1-7.
English language translation of abstract of JP 10-322307 (published Dec. 4, 1998).
English language translation of abstract of JP 2001-156741 (published Jun. 8, 2001).
English language translation of abstract of JP 2002-319917 (published Oct. 31, 2002).
English language translation of abstract of JP 2005-005781 (published Jan. 6, 2005).
English language translation of abstract of JP 2006-092852 (published Apr. 6, 2006).
English language translation of abstract of JP 2008-072275 (published Mar. 27, 2008).
Hongyun, Q., et al.; "Further Considerations on IEEE 802.16m OFDMA Numberology;" IEEE C802.16m-08/236r4; May 6, 2008; pp. 1-24.

\* cited by examiner

METHODS FOR TRANSCEIVING DATA IN MULTI-BAND ORTHOGONAL FREQUENCY DIVISION MULTIPLE ACCESS COMMUNICATIONS SYSTEM AND COMMUNICATIONS APPARATUSES UTILIZING THE SAME

CROSS REFERENCE TO RELATED APPLICATIONS

This application claims the benefit of U.S. Provisional Application No. 61/078,509 filed Jul. 7, 2008 and entitled "ALIASING REDUCTION FOR DATA TRANSMISSION OVER GUARD SUBCARRIERS IN MULTI-BAND OFDMA SYSTEMS". The entire contents of which are hereby incorporated by reference.

BACKGROUND OF THE INVENTION

1. Field of the Invention

The invention relates to a method for transceiving data over guard sub-carriers in multi-band Orthogonal Frequency Division Multiple Access (OFDMA) systems.

2. Description of the Related Art

Orthogonal frequency division multiplexing (OFDM) is an efficient modulation scheme for signal transmission over frequency-selective channels. In OFDM, a wide bandwidth is divided into multiple narrow-band sub-carriers, which are arranged to be orthogonal with each other. The signals modulated on the sub-carriers are transmitted in parallel. Orthogonal frequency division multiple access (OFDMA) is one way using the basic format of OFDM to support multiple access for multiple subscribers. In OFDMA, multiple subscribers simultaneously use different sub-carriers, in a fashion similar to frequency division multiple access (FDMA).

In the recent years, OFDMA has been used as an efficient multiple access scheme to perform high speed wireless transmission over frequency selective channels with high spectral efficiency. Multi-band OFDMA is expected to be one of the essential technologies for fourth generation (4G) mobile cellular systems. 4G mobile cellular systems require, for example, up to 1 Gbps peak transmission rate and extended data transmission bandwidth.

Figure 1:
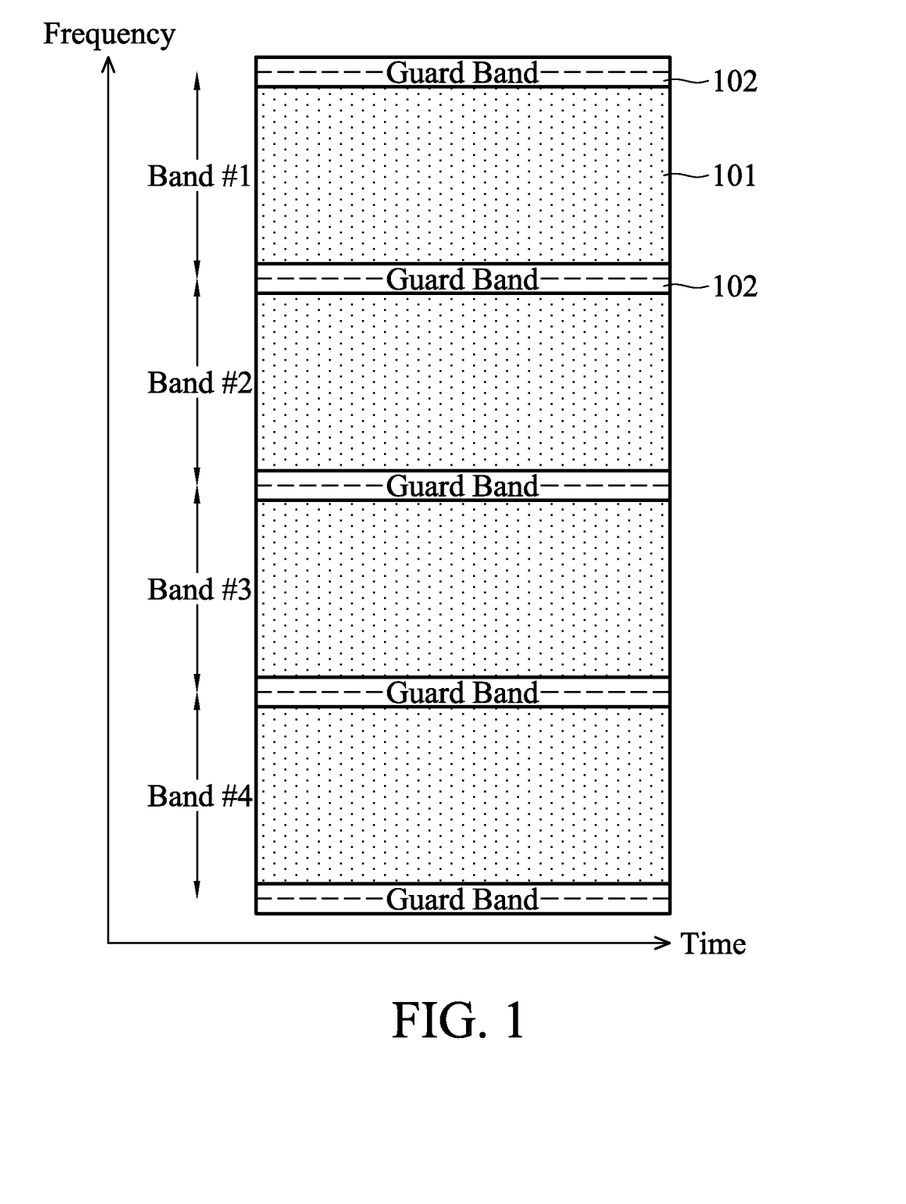
FIG. 1 is a spectrogram illustrating an exemplary example of extended data transmission bandwidth by using four RF carrier bands.

Multi-band OFDMA utilizes multiple Radio Frequency (RF) carriers to obtain extended data transmission bandwidth. FIG. 1 is a spectrogram illustrating an exemplary example of extended data transmission bandwidth by using four contiguous RF carrier bands (labeled by Band #1, Band #2, Band #3 and Band #4). Each RF carrier band is centralized with an RF carrier frequency, and comprises a predetermined amount of sub-carriers. For example, the amount of sub-carriers in each RF carrier band may be 1024 (corresponds to 1024 points of Inverse Fast Fourier Transform (IFFT)), and the bandwidth of the RF carrier band may be bound to about 10 MHz. In order to further improve the spectral efficiency of the multi-band OFDMA system, a novel data transceiving method with increased transmission rate is highly required.

BRIEF SUMMARY OF THE INVENTION

Communications apparatuses and methods for transceiving data in a multi-band Orthogonal Frequency Division Multiple Access (OFDMA) communications system are provided. An embodiment of such a communication apparatus comprises a receiving module, a low pass filter, an analog to digital converter (ADC), a Fast Fourier Transform (FFT) module and a sub-carrier collector. The receiving module receives a signal with a predetermined signal bandwidth. The signal comprises a plurality of regular sub-carrier frequency components and a plurality of guard sub-carrier frequency components, and the signal carries data on both the regular and the guard sub-carrier frequency components. The LPF filters the signal to obtain a filtered signal. A filter bandwidth of the LPF is wide enough to pass the regular sub-carrier frequency components and at least half of the guard sub-carrier frequency components of the signal. The ADC samples the filtered signal with a sampling rate exceeding a standard sampling rate defined in accordance with the predetermined signal bandwidth of the signal to obtain a plurality of digital samples. The FFT module performs a fast Fourier transform on a predetermined number of points of the digital samples to obtain a plurality of transformed samples. The predetermined number exceeds a standard number defined in accordance with the predetermined carrier bandwidth. The sub-carrier collector collects the data from the transformed samples.

An embodiment of a method for transceiving data in a multi-band OFDMA communications system comprises: transmitting the data through a plurality of radio frequency (RF) carrier bands to an air interface, wherein each RF carrier band has a predetermined signal bandwidth and comprises frequency components of N sub-carrier tones, comprising a plurality of regular sub-carrier tones and a plurality of guard sub-carrier tones located between adjacent RF carrier bands, and wherein the data is carried by both the regular sub-carrier tones and the guard sub-carrier tones; receiving an RF signal comprising the frequency components of at least one of the RF carrier bands from the air interface; processing the RF signal to obtain a plurality of digital samples, wherein the digital samples are obtained according to a sampling rate exceeds the predetermined signal bandwidth; and retrieving the data from the digital samples.

Another embodiment of a method for receiving data in a multi-band OFDMA communications system comprises: receiving a signal from an air interface, wherein the signal carries data within a radio frequency (RF) carrier band, and comprises a plurality of regular sub-carrier frequency components and a plurality of guard sub-carrier frequency components located at the edges of the RF carrier band; low pass filtering the signal by using a filter bandwidth wide enough to pass the regular sub-carrier frequency components and at least half of the guard sub-carrier frequency components of the signal to obtain a filtered signal; sampling the filtered signal with a sampling rate exceeding a predetermined signal bandwidth of the RF carrier band to obtain a plurality of digital samples; and retrieving the data from the digital samples.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

As well known to a person with ordinarily skill in the art, the unused part of the radio spectrum, such as the guard bands as shown in FIG. 1, are generally reserved between adjacent RF carrier bands to avoid signal interference and/or aliasing thereof due to non-ideal low pass filtering. In the embodiments of the invention, in order to improve the peak transmission rate of the multi-band OFDMA communications system, a novel transceiving scheme for data transmission over guard band without introducing contiguous band interference is proposed. The novel transceiving scheme will be described in greater detail in the following section.

Figure 2:
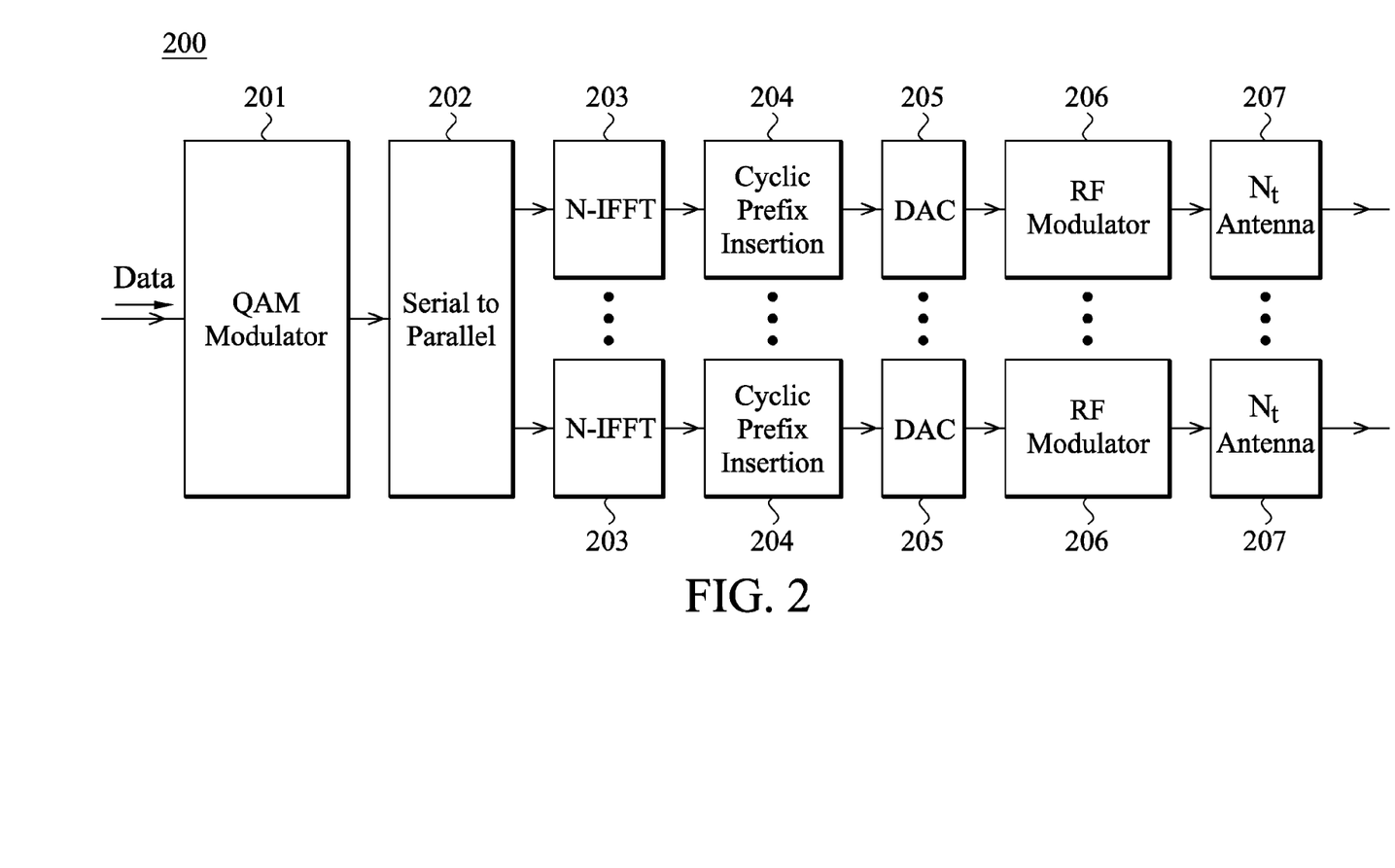
FIG. 2 shows a schematic diagram of the transmitting means in a communication apparatus according to an embodiment of the invention

FIG. 2 shows a schematic diagram of a transmitter 200 in a communication apparatus according to an embodiment of the invention. The QAM Modulator 201 first modulates the desired data to be transmitted by Quadrature Amplitude Modulation (QAM). The QAM may be 16-QAM, 64-QAM . . . and so on. After QAM modulation, the Serial to Parallel means 202 converts the serial data into parallel data. The IFFT means 203 next performs N points of Inverse Fast Fourier Transform (IFFT) on the parallel data so as to carry the data onto N orthogonal sub-carriers. According to an embodiment of the invention, all of the sub-carriers, including the regular sub-carriers located in the band 101 and the guard sub-carriers located in the bands 102 as shown in FIG. 1, may be used to transmit data. In other words, instead of carrying null tones, the guard sub-carriers in the guard band may be used to carry the desired data as the regular sub-carriers. After IFFT, the Cyclic Prefix Insertion means 204 inserts a cyclic prefix in the transformed data. The digital to analog converter (DAC) 205 next converts the digital data to analog signals. After the Radio Frequency (RF) Modulator 206 up converts the baseband analog signals to the RF signals according to the predetermined RF carrier frequency, the RF signals are transmitted to the air interface via the antennas 207. According to the embodiments of the invention, the transmitter 200 may carry the data on multiple RF carrier bands, such as the Band #1 to Band #4 shown in FIG. 1. Each RF carrier band has a central RF carrier frequency and a predetermined channel bandwidth (signal bandwidth). According to the embodiments of the invention, since the guard sub-carriers between adjacent RF carrier bands are used to transmit the desired data, the peak transmission rate of the OFDMA communications system is further increased and the spectrum efficiency is greatly improved.

Figure 3:
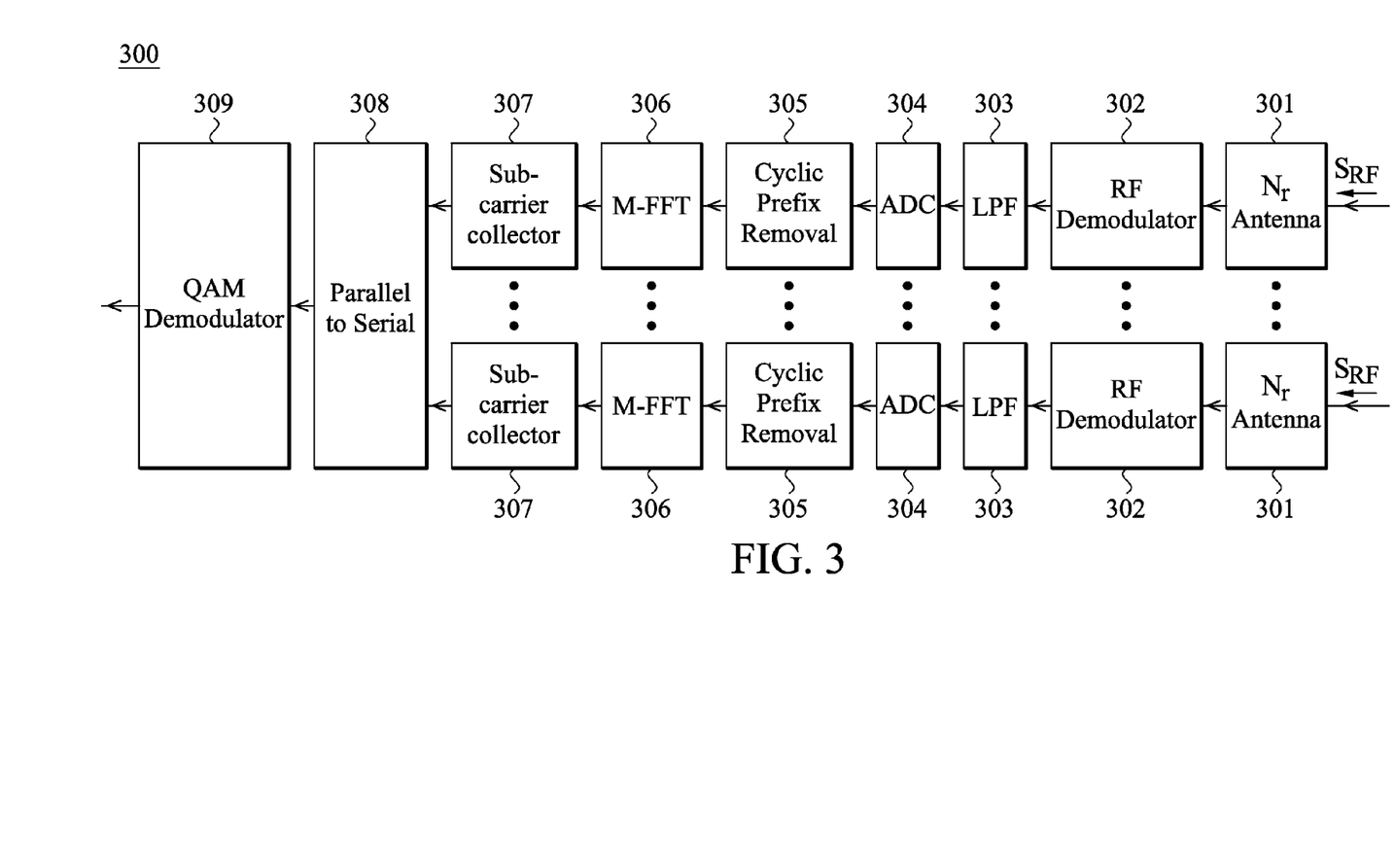
FIG. 3 shows a schematic diagram of a receiver 300 in a communication apparatus according to an embodiment of the invention.
Figure 4A:
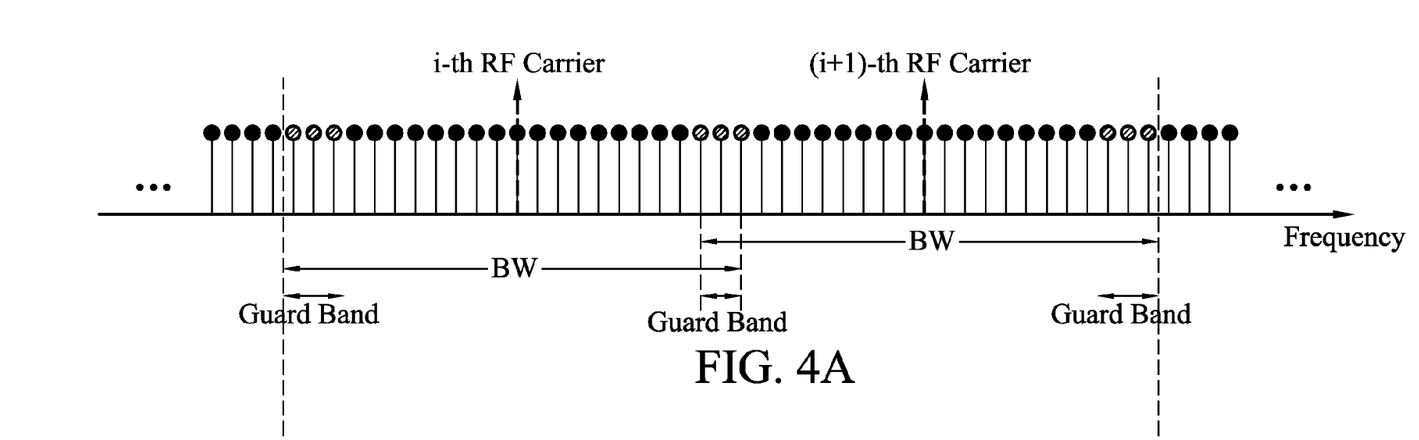
FIG. 4A to FIG. 4D shows schematic spectrums of multi-band RF signals according to an embodiment of the invention.
Figure 4B:
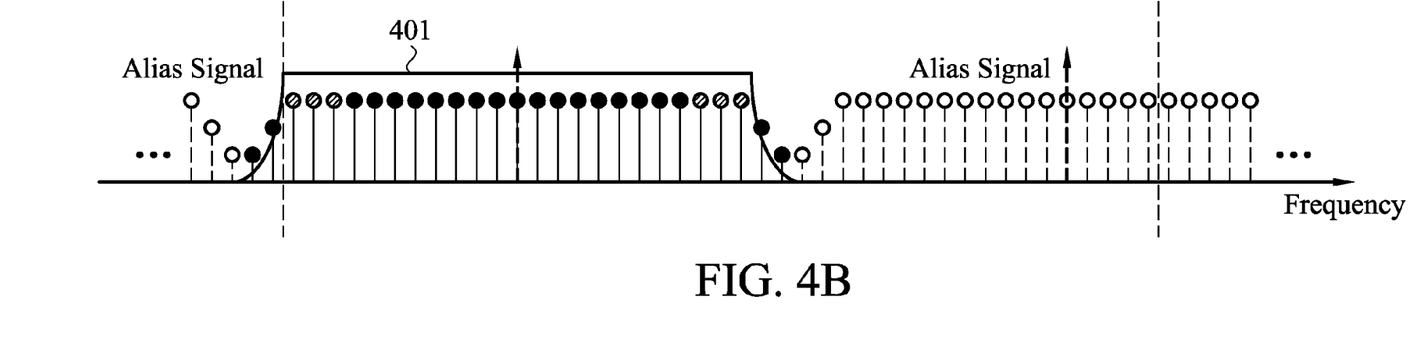
Figure 4C:
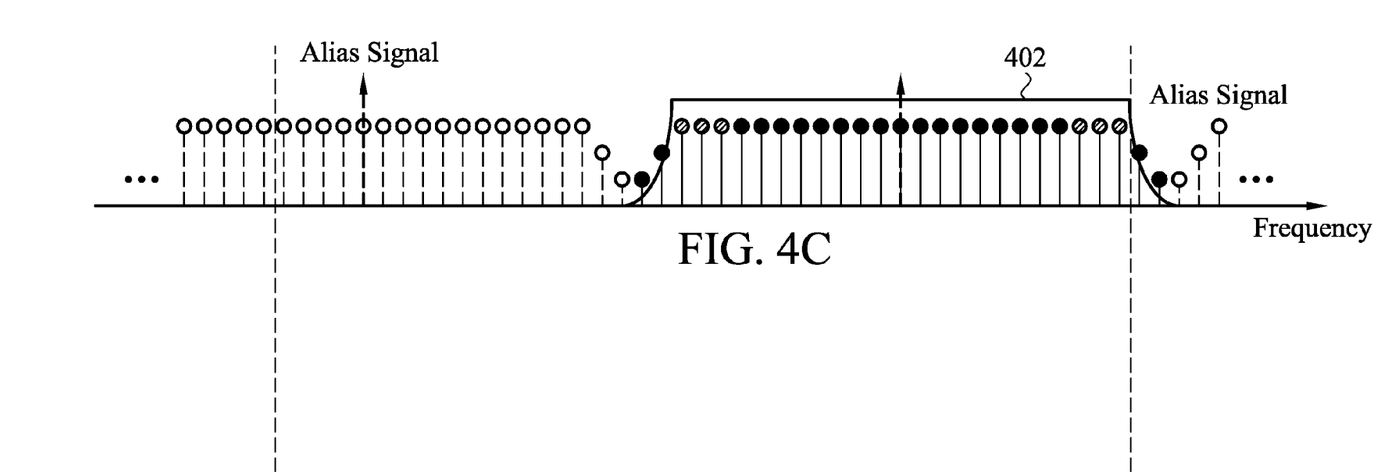

FIG. 3 shows a schematic diagram of a receiver 300 in a communication apparatus according to an embodiment of the invention. The antenna 301 may be one component of the receiving module to receive the RF signal $S_{RF}$ from the air interface. According to an embodiment of the invention, the receiver 300 may comprise multiple receiving paths to receive multi-band RF signals. Each RF signal $S_{RF}$ carries data of an RF carrier band within a predetermined signal bandwidth and comprises a plurality of regular sub-carrier frequency components and a plurality of guard sub-carrier frequency components, which are located around the edges of the RF carrier band as previously described. FIG. 4A is a schematic spectrum showing the frequency components of multi-band RF signals according to an embodiment of the invention. In FIG. 4A, the spectrum of i-th and (i+1)-th RF carrier bands is illustrated, wherein the solid circles represent the regular sub-carrier tones and the hollow circles filled with slashes represent the guard sub-carrier tones of the guard bands located between adjacent RF carrier bands. As shown in the figure, each RF carrier band has a predetermined bandwidth BW. As well known to a person with ordinarily skill in the art, the RF carrier bandwidth is well defined by the OFDMA standards. For example, an RF carrier bandwidth may be designed as 10 MHz (which is actually 11.2 MHz when the guard bands are included). The RF demodulator 302 may be another component of the receiving module to down convert the RF signal $S_{RF}$ to a baseband signal according to the predetermined RF carrier frequency of the RF carrier band. The Low Pass Filter (LPF) 303 filters out the unwanted signal to obtain a filtered signal. According to an embodiment of the invention, the filter bandwidth of the low pass filter may be designed wide enough to pass the regular sub-carrier frequency components and at least half of the guard sub-carrier frequency components in an RF carrier band without distortion. For example, as shown in FIG. 4B and FIG. 4C, the filter bandwidths of LPF 401 and LPF 402 are designed wide enough to pass both the regular sub-carrier frequency components and the guard sub-carrier frequency components. According to another embodiment of the invention, since the guard band is shared between adjacent RF carrier bands, the filter bandwidth of the low pass filter may also be designed wide enough to pass the regular sub-carrier frequency components and half of the guard sub-carrier frequency components of the signal.

Figure 4D:
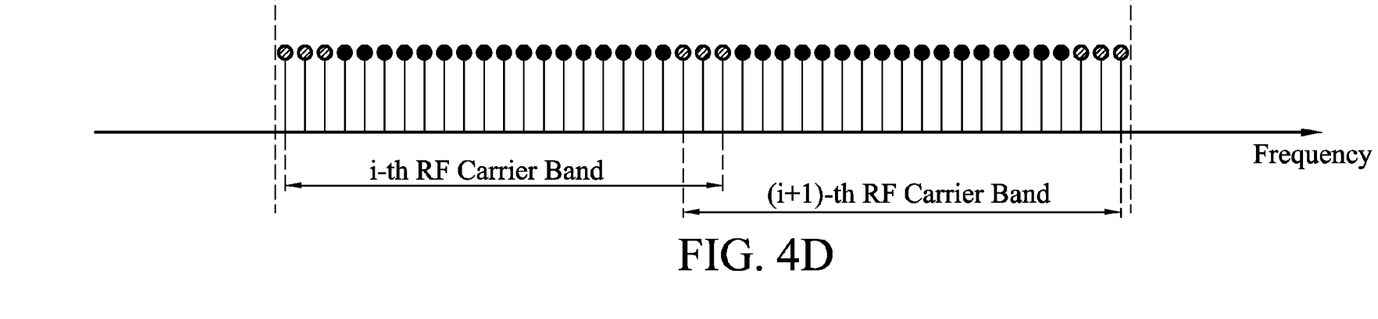

After low pass filtering, the analog to digital converter (ADC) 304 samples the filtered signal with a sampling rate $F_S$ to obtain a plurality of digital samples. According to the embodiment of the invention, the sampling rate $F_S$ may be designed to exceed a standard sampling rate $F_{Std}$. As well known to a person with ordinarily skill in the art, a standard sampling rate $F_{Std}$ and a standard number of points N for performing FFT/IFFT are generally defined in accordance with the RF carrier bandwidth BW. According to the embodiment of the invention, the filter bandwidth of LPF 303 is extended wider than the conventional LPF in an OFDMA receiver and the sampling rate $F_S$ of ADC 304 is designed higher than the standard sampling rate $F_{Std}$ so as to prevent the contiguous band interference. After ADC, the Cyclic Prefix Removal means 305 removes the inserted cyclic prefix from the digital samples and the Fast Fourier Transform (FFT) module 306 performs M points of FFT on the digital samples to obtain a plurality of transformed samples. According to the embodiment of the invention, the predetermined number M exceeds the standard number N defined in accordance with the predetermined carrier bandwidth as previously described. The regular sub-carrier tones and the guard sub-carrier tones modulated by the transmitter are retrieved after FFT and shown in FIG. 4D. After FFT, the sub-carrier collector 307 collects the data, which may be scrambled in the sub-carriers by the transmitter 200, from the transformed samples for further decoding. According to the embodiment of the invention, the sub-carrier collector 307 collects the data from both the regular and the guard sub-carrier tones. Finally, the parallel to serial means 308 converts the collected samples to obtain serial data and QAM demodulator 309 demodulates the serial data to retrieve the desired data.

According to an embodiment of the invention, the sampling rate $F_S$ of the ADC 303 may be a multiple of the standard sampling rate $F_{Std}$ or the predetermined RF carrier bandwidth BW. For example, a ratio of sampling rate $F_S$ to the standard sampling rate $F_{Std}$, or a ratio of the sampling rate $F_S$ to the predetermined signal bandwidth BW may be a power of 2. The predetermined number M of the FFT module 306 may relate to the ratio of $(F_S/F_{Std})$ or $(F_S/BW)$. For example, the predetermined number M of the FFT module 306 may be designed to be K×N, where K is a positive integer and relates to the ratio of $(F_S/F_{Std})$ or $(F_S/BW)$. According to the embodiment of the invention, with the extended filter bandwidth and the increased sampling rate, the interferences of the alias signals from the adjacent band(s) are substantially reduced. Thus, data transmission and reception over the guard band are achieved. In addition, based on the proposed transceiving scheme, the transmitter and receiver architectures may be applied, without any change, in different systems utilizing different numbers of RF carrier bands to obtain different system bandwidth.

Figure 5:
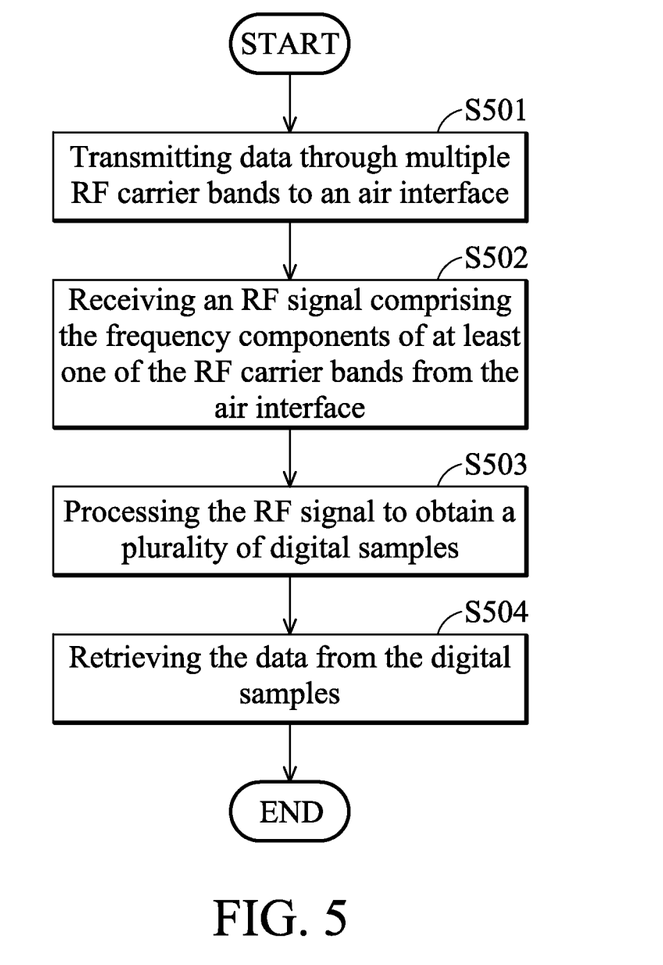
FIG. 5 shows a flow chart of a method for transceiving data in a multi-band Orthogonal Frequency Division Multiple Access (OFDMA) communications system according to an embodiment of the invention.

FIG. 5 shows a flow chart of a method for transceiving data in a multi-band Orthogonal Frequency Division Multiple Access (OFDMA) communications system according to an embodiment of the invention. According to the embodiment of the invention, the transmitter (such as transmitter 200) transmits the data through multiple RF carrier bands to an air interface (Step S501). Each RF carrier band has a predetermined signal bandwidth and may comprise the frequency components of N sub-carrier tones, comprising a plurality of regular sub-carrier tones and a plurality of guard sub-carrier tones located between adjacent RF carrier bands. The data is carried by both the regular sub-carrier tones and the guard sub-carrier tones. The receiver (such as receiver 300) receives an RF signal comprising the frequency components of at least one of the RF carrier bands from the air interface (Step S502). Next, the receiver processes the RF signal to obtain a plurality of digital samples (Step S503). According to the embodiment of the invention, the digital samples may be obtained according to a sampling rate exceeding the predetermined signal bandwidth of the RF signal. Finally, the receiver retrieves the data from the digital samples (Step S504).

Figure 6:
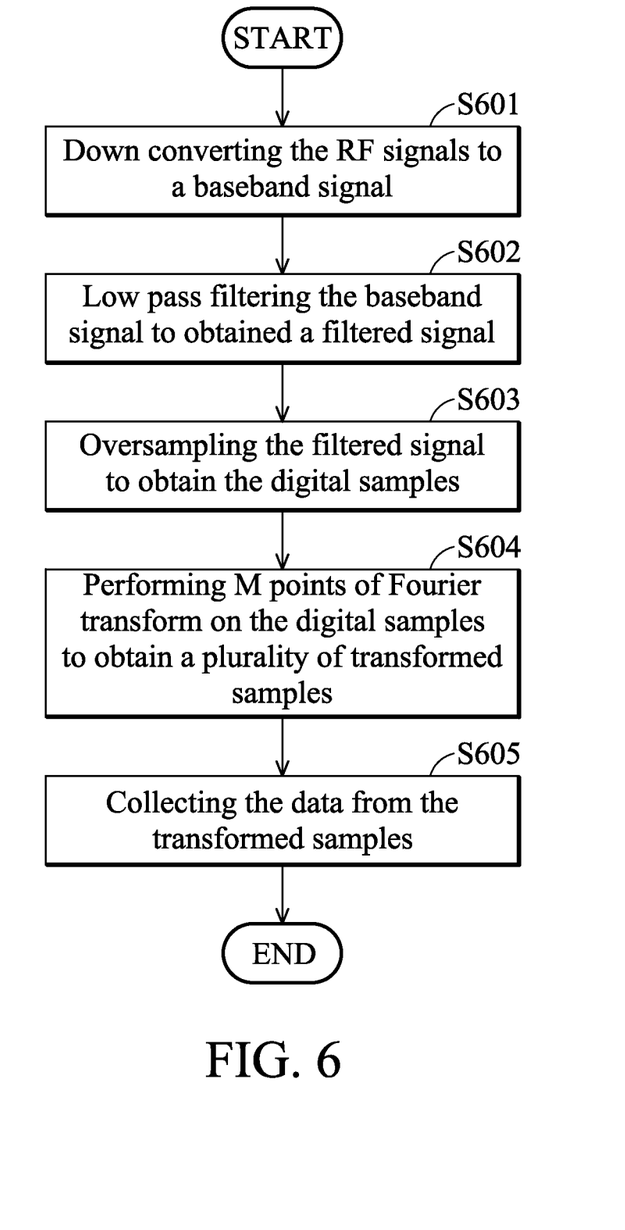
FIG. 6 shows a flow chart of a method for processing the RF signal to retrieve the data according to an embodiment of the invention.

FIG. 6 shows a flow chart of a method for processing the RF signal to retrieve the desired data according to an embodiment of the invention. The receiver first down converts the RF signals to a baseband signal (Step S601). Next, the receiver low pass filters the baseband signal by using a filter bandwidth wide enough to pass the regular sub-carrier tones and at least half of the guard sub-carrier tones of the received RF carrier band to obtain a filtered signal (Step S602). Next, the receiver oversamples the filtered signal with the sampling rate exceeding the predetermined signal bandwidth or the standard sampling rate of the RF signal to obtain the digital samples (Step S603). Next, the receiver performs M points of Fourier transform on the digital samples to obtain a plurality of transformed samples (Step S604), wherein M=K×N, K is a positive integer and relates to a ratio of the sampling rate to the predetermined signal bandwidth or a ratio of the sampling rate to the standard sampling rate. Finally, the receiver collects the data from the transformed samples (Step S605).

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus in a communications system, comprising:
    a receiving module, receiving a signal with a predetermined signal bandwidth, wherein the signal comprises a plurality of regular sub-carrier frequency components and a plurality of guard sub-carrier frequency components, and the signal carries data on both the regular and the guard sub-carrier frequency components;
    a low pass filter, filtering the signal to obtain a filtered signal, wherein a filter bandwidth of the low pass filter is wide enough to pass the regular sub-carrier frequency components and at least half of the guard sub-carrier frequency components of the signal;
    an analog to digital converter (ADC), sampling the filtered signal with a sampling rate exceeding a standard sampling rate defined in accordance with the predetermined signal bandwidth of the signal to obtain a plurality of digital samples;
    a Fast Fourier Transform (FFT) module, performing a fast Fourier transform on a predetermined number of points of the digital samples to obtain a plurality of transformed samples, wherein the predetermined number exceeds a standard number defined in accordance with the predetermined carrier bandwidth; and
    a sub-carrier collector, collecting the data from the transformed samples.

2. The communications apparatus as claimed in claim 1, wherein the transformed samples comprises a plurality of regular sub-carrier tones and a plurality of guard sub-carrier tones, and the sub-carrier collector collects the data from both the regular and the guard sub-carrier tones.

3. The communications apparatus as claimed in claim 1, wherein the data is transmitted over a plurality of radio frequency (RF) carrier bands, and each RF carrier band comprises the regular sub-carrier frequency components and the guard sub-carrier frequency components located between adjacent RF carrier bands within the predetermined signal bandwidth.

4. The communications apparatus as claimed in claim 3, wherein the filter bandwidth of the low pass filter is wide enough to pass both the regular sub-carrier frequency components and the guard sub-carrier frequency components of an RF carrier band.

5. The communications apparatus as claimed in claim 1, wherein the sampling rate of the ADC is a multiple of the standard sampling rate.

6. The communications apparatus as claimed in claim 1, wherein a first ratio of the sampling rate of the ADC to the standard sampling rate is a power of 2.

7. The communications apparatus as claimed in claim 6, wherein a second ratio of the predetermined number of a FFT point to the standard number relates to the first ratio.

8. The communications apparatus as claimed in claim 1, wherein the communications system is an Orthogonal Frequency Division Multiple Access (OFDMA) communications system.

9. A method for transceiving data in a multi-band Orthogonal Frequency Division Multiple Access (OFDMA) communications system comprising:
    transmitting the data through a plurality of radio frequency (RF) carrier bands to an air interface, wherein each RF carrier band has a predetermined signal bandwidth and comprises frequency components of N sub-carrier tones, comprising a plurality of regular sub-carrier tones and a plurality of guard sub-carrier tones located between adjacent RF carrier bands, and wherein the data is carried by both the regular sub-carrier tones and the guard sub-carrier tones;

receiving an RF signal comprising the frequency components of at least one of the RF carrier bands from the air interface;

processing the RF signal to obtain a plurality of digital samples, wherein the digital samples are obtained according to a sampling rate exceeds the predetermined signal bandwidth; and retrieving the data from the digital samples.

10. The method as claimed in claim 9, wherein the processing step further comprises:

down converting the RF signals to a baseband signal;

low pass filtering the baseband signal by using a filter bandwidth wide enough to pass the regular sub-carrier tones and at least half of the guard sub-carrier tones of the received RF carrier band to obtained a filtered signal; and oversampling the filtered signal with the sampling rate to obtain the digital samples.

11. The method as claimed in claim 9, wherein the sampling rate is a multiple of the predetermined signal bandwidth.

12. The method as claimed in claim 10, wherein the retrieving step further comprises:

performing a K×N points of Fourier transform on the digital samples to obtain a plurality of transformed samples, wherein K relates to a ratio of the sampling rate to the predetermined signal bandwidth; and collecting the data from the transformed samples.

13. The method as claimed in claim 10, wherein a ratio of the sampling rate to the predetermined signal bandwidth is a power of 2.

14. The method as claimed in claim 10, wherein the filter bandwidth of the low pass filtering is wide enough to pass both the regular sub-carrier tones and the guard sub-carrier tones of the received RF carrier band.

15. A method for receiving data in a multi-band Orthogonal Frequency Division Multiple Access (OFDMA) communications system comprising:

receiving a signal from an air interface, wherein the signal carries data within a radio frequency (RF) carrier band, and comprises a plurality of regular sub-carrier frequency components and a plurality of guard sub-carrier frequency components located at the edges of the RF carrier band, wherein the signal carries data on both the regular and the guard sub-carrier frequency components;

low pass filtering the signal by using a filter bandwidth wide enough to pass the regular sub-carrier frequency components and at least half of the guard sub-carrier frequency components of the signal to obtain a filtered signal;

sampling the filtered signal with a sampling rate exceeding a predetermined signal bandwidth of the RF carrier band to obtain a plurality of digital samples; and retrieving the data from the digital samples.

16. The method as claimed in claim 15, wherein the signal has been modulated by using N points of Inverse Fast Fourier Transform (IFFT) to carry data within the RF carrier band, and the method further comprises:

performing M points of Fast Fourier Transform (FFT) on the digital samples to obtain a plurality of transformed samples, wherein M is a positive integer and exceeds N; and collecting the data from the transformed samples.

17. The method as claimed in claim 15, wherein a ratio of M to N is a positive integer and relates to a ratio of the sampling rate to the predetermined signal bandwidth.

18. The method as claimed in claim 15, wherein a ratio of the sampling rate to the predetermined signal bandwidth is a power of 2.

19. The method as claimed in claim 15, wherein the filter bandwidth is wide enough to pass both the regular sub-carrier frequency components and the guard sub-carrier frequency components of the signal to obtain the filtered signal.

20. The method as claimed in claim 15, further comprising:

performing a fast Fourier transform on a predetermined number of points of the digital samples to obtain a plurality of transformed samples, wherein the predetermined number exceeds a standard number defined in accordance with the predetermined carrier bandwidth, and wherein the transformed samples comprise a plurality of regular sub-carrier tones and a plurality of guard sub-carrier tones, and the sub-carrier collector collects the data from both the regular and the guard sub-carrier tones.

* * * * *